(12) United States Patent
Anderson et al.

(10) Patent No.: US 12,398,340 B2
(45) Date of Patent: Aug. 26, 2025

(54) INJECTOR FOR INJECTING FLUID INTO POROUS MEDIA

(71) Applicant: Crown Iron Works Company LLC, Blaine, MN (US)

(72) Inventors: George E. Anderson, Champlin, MN (US); Benjamin Wayne Floan, Andover, MN (US); Jeffrey Kimball Garritsen, Forest Lake, MN (US)

(73) Assignee: CROWN IRON WORKS COMPANY LLC, Blaine, MN (US)

( * ) Notice: Subject to any disclaimer, the term of this patent is extended or adjusted under 35 U.S.C. 154(b) by 373 days.

(21) Appl. No.: 17/790,696

(22) PCT Filed: Dec. 30, 2020

(86) PCT No.: PCT/US2020/067467
§ 371 (c)(1),
(2) Date: Jul. 1, 2022

(87) PCT Pub. No.: WO2021/138422
PCT Pub. Date: Jul. 8, 2021

(65) Prior Publication Data
US 2023/0042064 A1    Feb. 9, 2023

Related U.S. Application Data

(60) Provisional application No. 62/956,505, filed on Jan. 2, 2020.

(51) Int. Cl.
*C11B 1/10*    (2006.01)
*B01D 11/02*   (2006.01)

(52) U.S. Cl.
CPC ............ *C11B 1/10* (2013.01); *B01D 11/0246* (2013.01)

(58) Field of Classification Search
None
See application file for complete search history.

(56) References Cited

U.S. PATENT DOCUMENTS

| 2,249,792 A | 7/1941 | Skinner |
| 3,434,933 A | 3/1969 | Mansfield |

(Continued)

FOREIGN PATENT DOCUMENTS

| FR | 2578867 A1 | 9/1986 |
| GB | 456587 A | 11/1936 |
| WO | 2013159024 A1 | 10/2013 |

OTHER PUBLICATIONS

International Search Report and Written Opinion of the International Application No. PCT/2020/067467, mailed Mar. 31, 2021, 8 pg.

(Continued)

*Primary Examiner* — Ali Z Fadhel
(74) *Attorney, Agent, or Firm* — Fredrikson & Byron, P.A.

(57) ABSTRACT

A liquid extractor may include an extraction chamber containing a bed deck configured to support a solid material as the solid material is conveyed through the extraction chamber. To introduce solvent into the solid material being processed, the extractor may include a solvent injection orifice extending through the bed deck and a solvent injector. The solvent injector can receive solvent from a source and cause the solvent to rotate within the solvent injector before discharging the solvent through an outlet in fluid communication with the solvent injection orifice. The rotational flow motion imparted by the injector can create a vortex that functions to scout out any particles that may be present in the injector.

16 Claims, 6 Drawing Sheets

(56) References Cited

U.S. PATENT DOCUMENTS

| | | | |
|---|---|---|---|
| 3,803,879 A | 4/1974 | Holm | |
| 3,856,474 A | 12/1974 | Pittman et al. | |
| 4,151,067 A | 4/1979 | Grow | |
| 4,198,725 A | 4/1980 | Trutzschler | |
| 4,608,122 A | 8/1986 | Klein et al. | |
| 4,873,103 A | 10/1989 | Cordera | |
| 5,408,924 A | 4/1995 | Arendt et al. | |
| 5,770,082 A | 6/1998 | Anderson | |
| 5,829,691 A | 11/1998 | Gaudin | |
| 6,101,738 A | 8/2000 | Gleason | |
| 6,846,061 B2 | 1/2005 | Nakashima | |
| 7,470,372 B2 | 12/2008 | Martin | |
| 8,071,034 B2 * | 12/2011 | de Broqueville | B01J 8/14 422/135 |
| 8,999,246 B2 * | 4/2015 | Chan | C10G 9/005 422/139 |
| 9,511,307 B2 | 12/2016 | Floan et al. | |
| 11,389,746 B2 | 7/2022 | Anderson | |
| 2004/0113973 A1 | 6/2004 | Nakashima | |
| 2006/0090366 A1 | 5/2006 | Williamson et al. | |
| 2014/0308187 A1 * | 10/2014 | Messineo | B01D 53/75 423/210 |
| 2015/0011372 A1 * | 1/2015 | Yoshida | B04B 11/02 494/53 |
| 2015/0132198 A1 * | 5/2015 | Floan | B01D 11/023 422/268 |
| 2017/0246556 A1 | 8/2017 | Floan | |
| 2020/0171449 A1 * | 6/2020 | Paasche | B01F 35/1453 |

OTHER PUBLICATIONS

European Patent Office, "extended European Search Report", for Application No. 20910568.3, dated Feb. 13, 2024, pp. 1-8.

* cited by examiner

INJECTOR FOR INJECTING FLUID INTO POROUS MEDIA

This application is a 35 U.S.C. 371 national stage filing from International Application No. PCT/US2020/067467, filed Dec. 30, 2020, which claims the benefit of U.S. Provisional Patent Application No. 62/956,505, filed Jan. 2, 2020. The entire contents of both of these applications are incorporated herein by reference.

RELATED MATTERS

This application claims priority to U.S. Provisional Patent Application No. 62/956,505, filed Jan. 2, 2020, the entire contents of which are incorporated herein by reference.

TECHNICAL FIELD

This disclosure relates to injectors and, more particularly, to injectors useful for injecting fluid into a porous media having a tendency to plug the injector during non-operation.

BACKGROUND

A variety of different industrial processes involve processing porous media by injecting a fluid into the media. The fluid may be a gas, liquid, or combination of gas and liquid. The media may be any type of organic and/or inorganic material and may have a particle size sufficiently small to allow the media to be fluidized and/or flowable within the process. Example processes include, but are not limited to, chemical reactions, catalytic reactions, sterilization treatments, coating processes, painting processes, and passivation treatments.

In some applications, the porous media being processed may be a granular type of material that is circular, rounded, and/or irregular in shape with spacing between adjacent particles that is effective allow individual granules to flow relative to each other. The porous media may have an average particle size smaller than the size of an opening through which fluid is injected into the media (and/or a particle size distribution that includes a fraction sized smaller than that of such an opening). As a result, the media may have a tendency to enter the fluid opening during shutdown or period of operation when fluid is not flowing out of the opening. This can create plugging and other processing challenges within the system.

SUMMARY

In general, this disclosure is directed to injector configurations and related systems and techniques incorporating the injector. The injector may be used inject a fluid into a porous media being processed. In some applications, the injector is arranged to inject fluid through an outlet opening positioned vertically below the material being processed, e.g., such that the material has a tendency to flow back into the outlet opening under a force of gravity when fluid is not flowing out of the opening. However, the outlet opening through which the injector is configured to inject fluid can be arranged at any location relative to the material being processed.

While an injector according to the disclosure can have a variety of different configurations, in some implementations, the injector has a body defining a chamber, an inlet in fluid communication with the chamber, and the outlet also in fluid communication with the chamber. The chamber may define a generally circular cross-sectional shape, such as having a circular or oval cross-sectional shape. The inlet may be arranged tangentially to the chamber such that, when solvent enters the chamber via the inlet, the solvent contacts a curved interior wall surface of the chamber and begins circularly flowing about the chamber. The solvent may rotate partially or fully about the perimeter of the chamber one or more rotations before discharging via the outlet.

To help further inhibit plugging of the injector, in some configurations, the outlet of the injector may be arranged to intersect the injection orifice extending through a deck surface on which material is being processed at a non-perpendicular angle. In other words, the outlet of the injector may be arranged at a non-perpendicular angle with respect to a parallel top surface of the deck surface. For example, the injector may be mounted under the surface and include a first portion extending generally parallel to the surface and a second portion angled upwardly relative to the first portion to the surface. When so configured, a lip of the deck surface can overhang the first portion of the outlet, helping to protect the outlet from being plugged with downwardly flowing material.

The configuration of the injector can reduce or eliminate backflow of solids when fluid (e.g., liquid) is not being injected and/or during start-up sequences and/or shutdown sequences. The injector can define an internal volume within a vortex-cylinder chamber to allow slight backflow of solids but still not jam on restart and also not jam during flow with some percent fines in the fluid being injected. Moreover, the turbulence and cyclonic force generated inside of the injector can forcibly clear any solid material that has entered the injector from the vortex-cylinder chamber at any condition of run or stop or restart.

The injector can be used to introduce a fluid (e.g., liquid, gas) into any type of granular media. The media may an organic media and/or an inorganic media. The media may have an average particle size smaller than the size of the outlet opening of the injector through which fluid is injected into the media and/or a particle size distribution that includes a fraction sized smaller than that of such an opening. Example applications include, but are not limited to, injecting fluid into harvested crop materials, for chemical reactions, for catalytic reactions, sterilization treatments, coating processes, painting processes, and passivation treatments.

While an injector according to the disclosure can be used for any desired application, in one specific example, the injector is used in a liquid extraction system to extract and recover liquid substances entrained within solids. For example, producers of oil from renewable organic sources use extractors to extract oil from oleaginous matter, such as soybeans, rapeseed, sunflower seed, peanuts, cottonseed, palm kernels, and corn germ. The oleaginous matter is contacted with an organic solvent within the extractor, causing the oil to be extracted from a surrounding cellular structure into the organic solvent. As another example, extractors are used to recover oil from oil sands and other petroleum-rich materials. Typically, the petroleum-rich material is ground into small particles and then passed through an extractor to extract the oil from the solid material into a surrounding organic solvent.

In some examples, an extractor system has an extraction chamber containing a bed deck configured to support a solid material as the solid material is conveyed through the extraction chamber. To introduce solvent into the solid material being processed, the extractor may include a solvent injection orifice extending through the bed deck and a solvent injector. The solvent injector can receive solvent from a source and cause the solvent to rotate within the solvent injector before discharging the solvent through an outlet in fluid communication with the solvent injection orifice. The rotational flow motion imparted by the injector can create a vortex that functions to scour out any particles that may be present in the injector. This can be useful to prevent plugging and/or to clear plugging of the injector that may occur during operation of the extractor.

While an injector according to the disclosure can be used to inject solvent into a solid material undergoing extraction, the injector can be used in a variety of different applications in addition to or in lieu of injecting solvent into a solid material being processed on an extractor bed deck. For example, the injector may be positioned on a wall of a chute or hopper of an extractor to inject liquid into a falling column of solid material. The injected liquid can help initiate or continue an extraction, leaching, or a similar wetting process. As another example, the injector can be used to inject liquid on a bed deck of the extractor, such as on a conveyor (e.g., drive line) that travels along the bed deck. The injected liquid (e.g., which may be extracted oil, miscella, solvent or other liquid) can help lubricate the conveyor to minimize wear and extend the service life of the extractor. In still other examples, the injector can be used to inject fluid upwardly into a bed of porous material positioned on surface within a non-extractor processing chamber.

In one example, a liquid injection system is described that includes a deck surface configured to support a solid material being processed, at least one liquid injection orifice extending through the deck surface for supplying liquid to the solid material on the deck surface, and at least one injector. The example specifies that the injector is configured to receive a liquid from a source and cause the liquid to rotate within the injector before discharging the liquid through an outlet in fluid communication with the at least one liquid injection orifice.

In another example, an extractor is described that includes an extraction chamber, a bed deck configured to support a solid material as the solid material is conveyed through the extraction chamber, and a conveyance system configured to convey the solid material along the bed deck in a direction of material travel. The example specifies that the extractor also includes at least one solvent injection orifice extending through the bed deck for supplying solvent to the solid material on the bed deck and at least one solvent injector. The injector is configured to receive a solvent from a source and cause the solvent to rotate within the solvent injector before discharging the solvent through an outlet in fluid communication with the at least one solvent injection orifice.

The details of one or more examples are set forth in the accompanying drawings and the description below. Other features, objects, and advantages will be apparent from the description and drawings, and from the claims.

DETAILED DESCRIPTION

Figure 1:
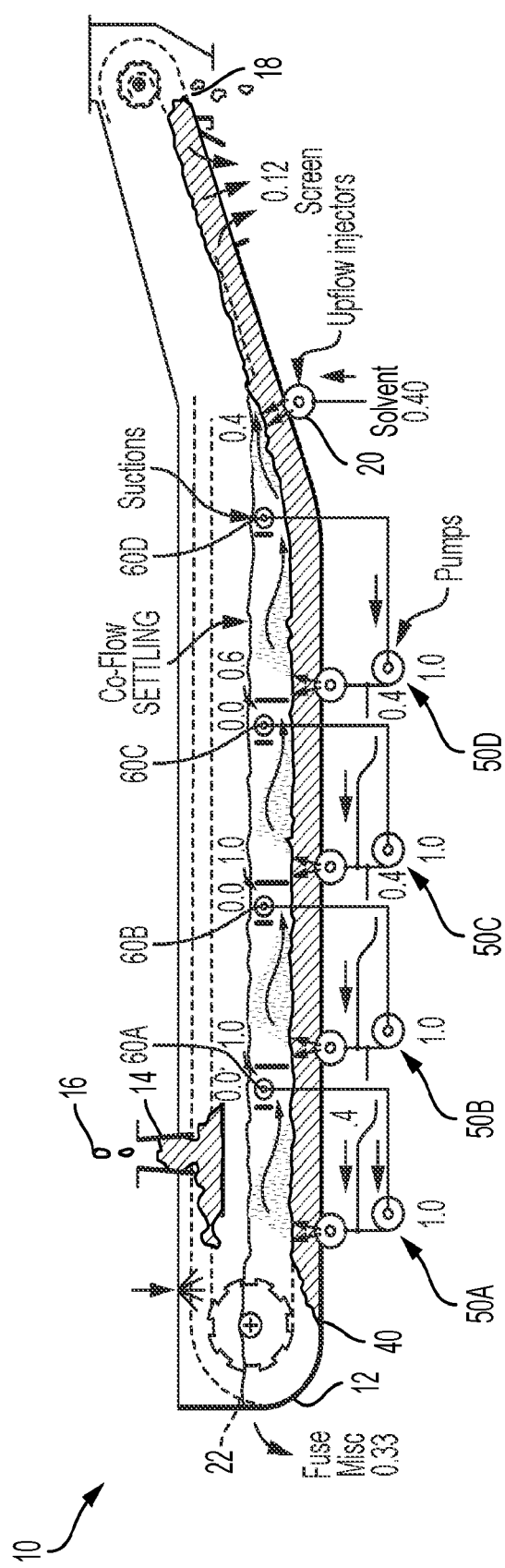
FIG. 1 is a conceptual illustration of an example extractor system that can utilize an injector according to the disclosure.

This disclosure is generally directed to an injector useful to injecting fluid (e.g., liquid) into a porous, granular solid material having a tendency to plug the injector during non-operation. The injector can have an inlet in fluid communication with the swirling/vortex chamber and the outlet also in fluid communication with the swirling/vortex chamber. The chamber may define a generally circular cross-sectional shape. The inlet may be arranged tangentially to the swirling/vortex chamber such that, when liquid enters the chamber via the inlet, the liquid contacts a curved interior wall surface of the chamber and begins swirling around the chamber. This swirling can generate a vortex within the chamber.

The injector can be used to inject liquid into any type of granular material being processed and/or inject liquid containing entrained solid material. In operation, a portion of the solid material being processed may flow back into the injector chamber, e.g., during periods of operation when liquid is not flowing out of the injector or flowing at a reduced velocity, such as during start-up and/or shutdown As a result, the injector chamber may partially or fully fill with the solid material being processed during these periods. However, the scouring action provided by the rotating flow of liquid generated inside of the injector can help fluidize any solid material that has flowed into the injector, clearing the injector chamber of potentially plugging solid material.

In some applications, the injector is arranged to inject fluid through an outlet opening positioned vertically below the material being processed on a deck surface, e.g., such that the material has a tendency to flow back into the outlet opening under a force of gravity when fluid is not flowing out of the opening. However, the outlet opening through which the injector is configured to inject fluid can be arranged at any location relative to the material being processed.

An injector according to the disclosure can be used in any desired application, such as to inject fluid into harvested crop materials, for chemical reactions, for catalytic reactions, sterilization treatments, coating processes, painting processes, for passivation treatments, and the like. While an injector according to the disclosure can be used for any desired application, in one example, the injector is used in a liquid extraction system to extract and recover liquid substances entrained within solids. For example, the solid material being processed may be passed through a continuous flow extractor that conveys a continuous flow of material from its inlet to its outlet while a solvent is conveyed in a countercurrent direction from a solvent inlet to a solvent outlet. As the solvent is conveyed from its inlet to its outlet, the concentration of extracted liquid relative to solvent increases from a relatively small extract-to-solvent ratio to a comparatively large extract-to-solvent ratio. Similarly, as the solid material is conveyed in the opposing direction, the concentration of extract in the solid feedstock decreases from a comparatively high concentration at the inlet to a comparatively low concentration at the outlet. The solvent discharged from the extractor, which may be referred to as a miscella, contains extracted components (e.g., oil) from the solid feedstock and may contain other components, such as dust and small particulate fines released from the feedstock during processing.

Figure 2:
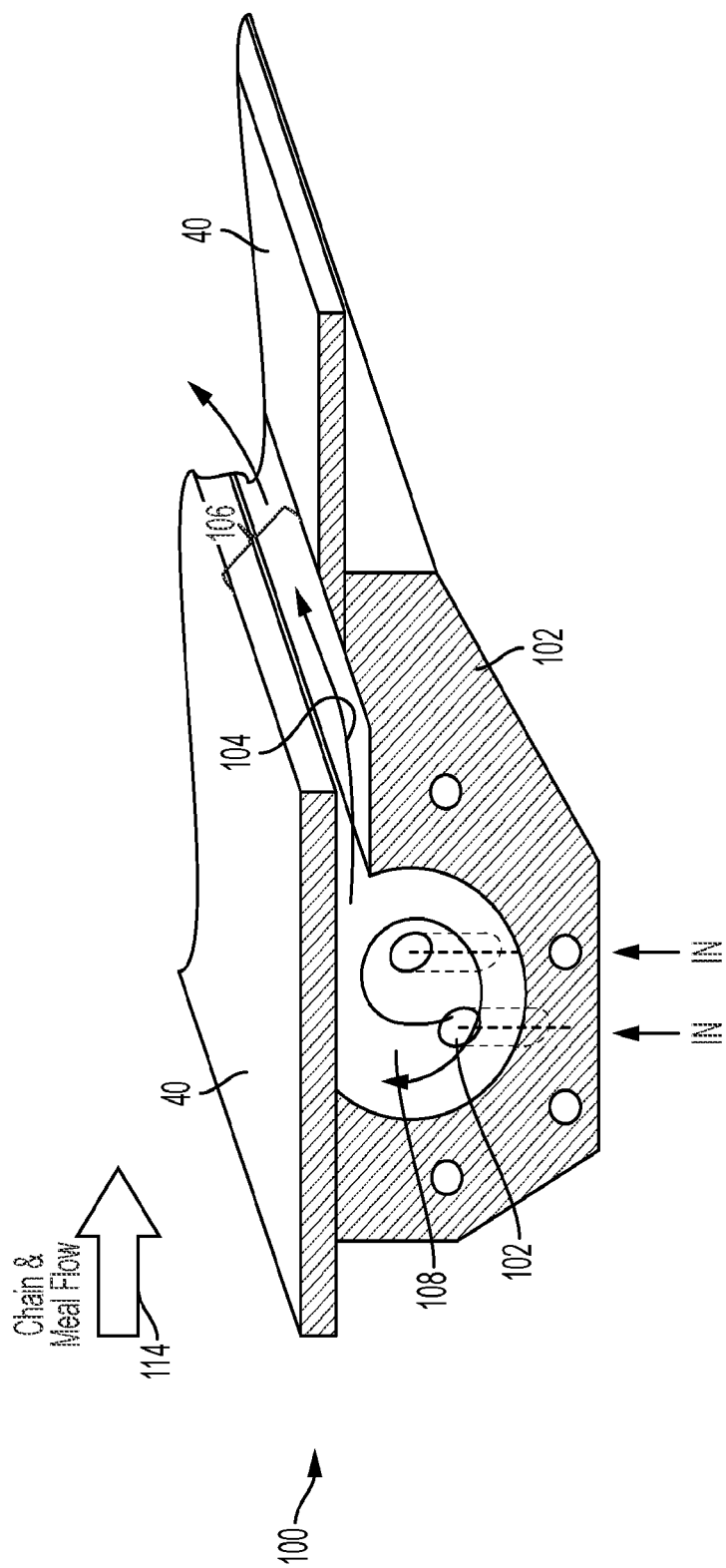
FIG. 2 is perspective view of an example injector that can be used on the extractor of FIG. 1.
Figure 3:
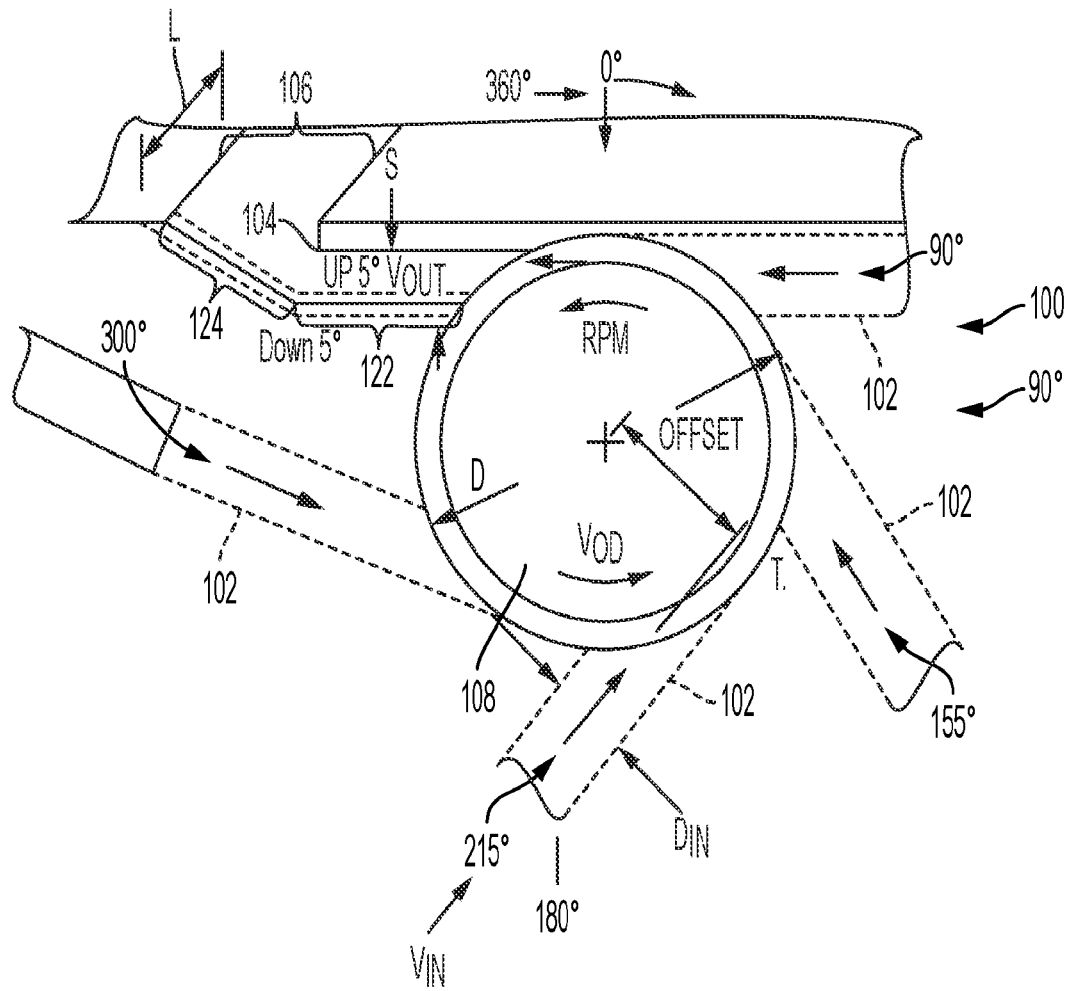
FIG. 3 a side view of the example injector of FIG. 2 showing a variety of exemplary configuration options for the injector.

Details on example injector configurations usable in any application are described in greater detail with respect to FIGS. 2 and 3. However, an example extractor system that can utilize an injector according to the disclosure is first described with respect to FIG. 1.

In FIG. 1, an extractor 10 is illustrated as an immersion extractor that includes a housing 12 containing one or more extraction stages through which a solid material being processed can travel (e.g., in a co-current or countercurrent direction with an extraction solvent). Housing 12 includes a feed inlet 14 configured to receive a continuous flow of solid material 16 being processed. Extractor 12 also includes a feed outlet 18 configured to discharge the solid material 16 after some or all of the extract has been extracted into solvent flowing through the extractor.

To provide a flow of solvent passing through extractor 10, housing 12 also includes one or more solvent inlets 20, such as a first solvent inlet 20 that receives solvent devoid of extract or having a comparatively low concentration of extract. A solvent outlet 22 is provided on a generally opposite end of housing 12 to discharge solvent having passed through extractor 10. As solvent travels through housing 12 from inlet 20 to outlet 22, the solvent can flow in a countercurrent direction from the flow of particulate material 16 passing through the extractor. The solvent intermixes with particulate material 16 within extractor 10, causing the extract carried by the solid material to transfer from the solid material to the solvent. Accordingly, in operation, solvent having a comparatively low concentration of extract enters at inlet 20 while solvent having an increased concentration of extract discharges at outlet 22. Likewise, fresh particulate solid material 16 carrying extract enters at inlet 14 while processed particulate material having a reduced concentration of extract is discharged at outlet 18.

In the example of FIG. 1, extractor 10 also includes a fluid supply system 50A-50D (collectively "fluid supply system 50") disposed below the solid material and configured to apply a fluid upwardly through a bed deck into the solid material being conveyed through the extraction chamber. As will be described, fluid supply system 50 may include an injector fluidly connected to a solvent orifice extending through the bed deck, which is used to control the flow of solvent up into the solid material on the bed deck.

Extractor 10 in FIG. 1 also includes a fluid removal system 60A-60D (collectively "fluid removal system 60") having an outlet positioned above the solid material and configured for removing the fluid after it has passed through the solid materials (e.g., flowing vertically upwardly) in each extraction chamber. In some examples, a fluid supply system and a fluid removal system are in fluid communication via various recycle streams and the like. The fluid supply system may include a network of spray headers, pumps, and pipes to apply the fluid in each extraction chamber. The fluid supply system can apply (e.g., spray) the extraction fluid on the bottom of the conveyed solid material, allowing the extraction fluid to then flow upwardly through the material. The fluid removal system may include a network of drains, pumps, and pipes to collect the fluid after it has passed through the solid material in each extraction chamber and deliver it to the fluid supply system of another extraction chamber or remove it from the system.

Extractor 10 can be operated as an immersion extractor in which a pool or reservoir of solvent 24 is maintained in housing 12 to provide a desired solvent level inside the extractor. In such applications, solid material 16 is immersed (e.g., submerged) in the pool of solvent 24 as it moves through extractor 10. In some examples, solid material 16 remains completely submerged in the pool of solvent as it travels through extractor 10, e.g., except when adjacent inlet 14 and outlet 16. In other examples, solid material 16 travels above the pool of solvent 24 at different stages in extractor 10, e.g., before falling off the end of a conveyor and dropping back into a pool of solvent.

To convey solid material 16 through extractor 10, the extractor can have one or more conveyors that convey the material (e.g., in a countercurrent direction) through the extraction chamber. In the configuration of FIG. 1, for instance, extractor 10 has a single conveyor 30 that conveys solid material 16 through the solvent pool 24 contained within housing 12, although can have more conveyors. In some configurations, the conveyor system includes a pair of laterally spaced endless link chains and a plurality of longitudinally spaced flights that extend transversely of the chains. A motor and gearing may be provided to drive the conveyor. For example, the conveyor may include flights that drag across the top surface of the bed deck, causing solid material introduced through inlet 16 to convey across the top surface of the bed deck toward outlet 18.

Solid material 16 can travel along one or more bed decks 40 positioned inside of extractor 10 to define a bed of material. Each bed deck 40 may include apertured and/or non-apertured sections of plating. For example, bed deck 40 may be formed of a screen having apertures through which liquid can flow and/or sheets of plating (e.g., metal plating) that provides a support surface without allowing liquid to flow through the plating.

In some examples, the pool of solvent 24 contained within housing 12 is divided into fluidly interconnected sub-pools, e.g., to provide different equilibrium extraction stages. In the example of FIG. 1, extractor 10 is illustrated as having four solvent pools, with a barrier between adjacent pools. In operation, each solvent pool may have a different average extract-to-solvent concentration ratio to provide different stages of extraction. The concentration ratio may progressively increase from a lowest concentration adjacent solvent inlet 20 to a highest concentration adjacent solvent or outlet 22.

Extractor 10 can process any desired solid material using any suitable extraction fluid. Example types of solid material that can be processed using extractor 10 include, but are not limited to, oleaginous matter, such as soybeans (and/or soy protein concentrate), rapeseed, sunflower seed, peanuts, cottonseed, palm kernels, and corn germ; oil-bearing seeds and fruits; asphalt-containing materials (e.g., asphalt-containing roofing shingles that include an aggregate material such as crushed mineral rock, asphalt, and a fiber reinforcing); stimulants (e.g., nicotine, caffeine); alfalfa; almond hulls; anchovy meals; bark; coffee beans and/or grounds, carrots; chicken parts; chlorophyll; diatomic pellets; fish meal; hops; oats; pine needles; tar sands; vanilla; and wood chips and/or pulp. Fluids that can be used for extraction from solid material include, but are not limited to a hydrocarbon (e.g., acetone, hexane, toluene), alcohol (e.g., isopropyl alcohol, ethanol, other alcohols), and water (with or without soap and/or surfactant).

Depending on the application, the operating temperature of the fluid and/or solid materials being processed inside of extractor 10 may be at an elevated temperature, such as a temperature greater than 25 degrees Celsius. For example, the temperature may range from 50 degrees Celsius and 100 degrees Celsius.

FIG. 1 illustrates one example configuration of an extractor that can utilize an injector according to the disclosure. It should be appreciated that the injector can be used in other extractor configurations, including percolation extractor designs and immersion extractors having different configurations that that illustrated with respect to FIG. 1.

FIG. 2 is perspective view of an example injector 100 according to the disclosure that can be used in extractor 10 of FIG. 1. Injector 100 is configured to receive solvent from a source and cause the solvent to rotate within the injector before discharging the solvent through an outlet. In the example configuration of FIG. 2, injector is illustrated as having at least one inlet 102, which is illustrated as being implemented using a plurality of inlets arrayed across a length of the injector body. Injector 100 is also is illustrated as including one outlet 104. Outlet 104 is in fluid communication with an orifice 106 formed through bed deck 40. In operation, liquid can enter injector 100 via the one or more inlets 102, cause the received liquid to circulate (e.g., in a swirling and/or circumferential flow pattern), and subsequently discharge the liquid via outlet 104.

Injector 100 can include a body 110 that defines a chamber 108 for receiving fluid and causing the fluid to rotate within the chamber. Inlet 102 is fluidly connected to chamber 108 and can provide pressurized fluid to the chamber. Outlet 104 receives fluid from the chamber, e.g., after the fluid has rotated partially or fully about a circumferential perimeter of the chamber. Inlet 102 and outlet 104 may be arranged relative to each other and relative to chamber 108 (e.g., an interior wall surface of body 110 defining the chamber) that causes fluid entering the inlet to rotate within chamber 108 as the fluid moves from the inlet to the outlet.

For example, although inlet 102 and outlet 104 may be arranged a number of different ways relative to each other, in some implementations, inlet 102 is arranged tangentially to chamber 108 and/or outlet 104 is arranged tangentially to the chamber. In addition, inlet 102 may be radially offset about a perimeter of chamber 108 from outlet 104. As liquid enters chamber 108 via inlet 102, the liquid may impinge upon (e.g., contact) the interior wall surface of the chamber. The interior wall surface of the chamber may be curved, causing the liquid to follow the contour of the wall surface and thereby rotate at least partially about the circumference of the chamber before exiting chamber 108 via outlet 104. In practice, a portion of the liquid entering chamber 108 via inlet 102 may travel directly from inlet 102 outlet 104, thereby rotating about only a portion of the perimeter of the chamber. Another portion of the liquid entering chamber 108 via inlet 102 may circulate multiple times about the circumferential perimeter of the chamber before discharging via outlet 104. The extent and amount of rotation provided by injector 100 may be adjusted based on various design factors, such as the size of chamber 108, the size of inlet 102 and outlet 104, and the fluid dynamics (e.g., pressure, viscosity) of the liquid pass through the chamber.

To help impart a rotational motion to the liquid received by chamber 108, the chamber may be configured with a generally circular cross-sectional shape. For example, chamber 108 may defined a circular or elliptical cross-sectional shape. Other curved cross-sectional shapes may also be used, depending on the application.

As noted above, injector 100 can include in outlet 104 that is in fluid communication with an orifice 106 extending through bed deck 40. In various examples, orifice 106 may be a slit or other opening extending across at least a portion of the bed deck. For example, orifice 106 may be a slit bounded on one side by a section of material forming a bed deck surface on which solid material can travel as it moves through extractor 10 and also bounded on an opposite side by another section of material forming a bed deck surface. In various implementations, orifice 106 can extend perpendicularly across extractor 10 (e.g., a cross bed deck 40) relative to a direction of material travel 114 or can extend in a different direction relative to the direction of material travel. For example, orifice 106 may extend parallel to a direction of material travel 114 (e.g., lengthwise across extractor) or at any other desired angle relative to the direction of material travel.

When orifice 106 is configured as a slit in bed deck 40, the slit may extend partially or fully across the bed deck. For example, when orifice 106 extends across a width of extractor 10 (e.g., perpendicular to the direction of material travel 114 and/or at an angle relative to the direction of material travel that is not parallel to the direction material travel), the slit may at least 10% across the width of the bed deck, such as at least 25% across the width of the bed deck, at least 50% across the width of the bed deck, or at least 75% across the width of the bed deck. In other configurations, orifice 106 may not be a slit (e.g., having a length greater than width) but may be another apertured opening in the bed deck, for example, having a polygonal (e.g., square) or arcuate (e.g., circular) shape.

Injector 100 may be mounted at a variety of different locations about extractor 10 depending on where fluid is desirably injected into the extractor. In the example of FIG. 2, injector 100 is illustrated as being mounted under bed deck 40. For example, injector 100 may be fixedly coupled to bed deck 40, either directly or indirectly via one or more intermediate structures. Injector 100 may be coupled to the bed deck using mechanical fixation elements such as bolts, screws, welding, or other suitable fixation elements. When so implemented, injector 100 can be positioned to discharge liquid having passed through chamber 108 upwardly into a bed of material being processed on bed deck 40.

Configuring an extractor, such as extractor 10 from FIG. 1, with one or more injectors 100 to flow liquid upwardly into material being processed on bed deck 40 can be useful for a variety of reasons. In operation, solvent may be desirably injected into the solid material being processed on bed deck 40 to affect extraction of extractable components from the material. Orifice 106 and any fluid delivery structures in fluid communication there with may have a tendency to plug with solid material pushing downwardly under the force of gravity, e.g., particularly when solvent is not flowing out of the orifice. By configuring the extractor with one or more injectors 100 that impart a rotational motion to the incoming solvent, the injector can help prevent plugging and/or remove plug material from orifice 106 and the fluid delivery structures in fluid communication there with. For example, the rotational motion created by chamber 108 can help fluidized solid material that may have migrated down into orifice 106 and/or the fluid delivery structure and communication therewith. Additionally or alternatively, the rotational motion created by chamber 108 can help scour and remove material built up on the wall surfaces.

FIG. 3 a side view of injector 100 showing a variety of exemplary configuration options for the injector. As briefly discussed above, inlet 102 and outlet 104 can be arranged at a variety of different locations relative to chamber 108 to supply liquid to and receive liquid from the chamber. In general, inlet 102 and outlet 104 can be arranged at any desired location around the circumferential perimeter of chamber 108. FIG. 3 illustrates a variety of exemplary radial positions about the circumferential perimeter of chamber 108 where inlet 102 may be located. The exemplary inlet positions are illustrated relative to an axis 120 orthogonal to bed deck 40 (in the vertical direction with respect to gravity). In this example, outlet 104 is illustrated as extending from chamber 108 and angle approximately −90° relative to axis 120, such as at an angle ranging from −75 to −120 degrees relative to the axis orthogonal. In some such implementations, inlet 102 may positioned to extend from the chamber 108 at an angle greater than 90 degrees relative to an axis 120 orthogonal to the bed deck.

While outlet 104 may be arranged parallel to axis 120 (e.g., such that liquid is directed directly vertically upward), in other configurations, the outlet is arranged at a nonzero degree angle with respect to gravity (e.g., relative to axis 120). For example, as shown in FIG. 3, outlet 104 may include a first portion 122 extending generally parallel to the bed deck 40 and a second portion 124 angled upwardly to the solvent injection orifice 106 relative to the first portion 122. In different examples, the first portion may be flat (e.g., parallel to bed deck 40 and/or ground), may be slightly angled upwardly, and/or may even be angled downwardly to create a trough between chamber 108 and second portion 124. For example, first portion 122 may be angled within a range from plus 15 degrees to minus 15 degrees relative to a plane parallel to a top surface of the bed deck 40. Configuring injector 100 to have an outlet 104 that includes a portion that is generally horizontal (with respect to gravity) can be useful to help minimize plugging of injector 100. The horizontally arranged portion of outlet 104 may help prevent solid material on bed deck 40 from flowing back down into chamber 108 under the force of gravity.

Figure 4:
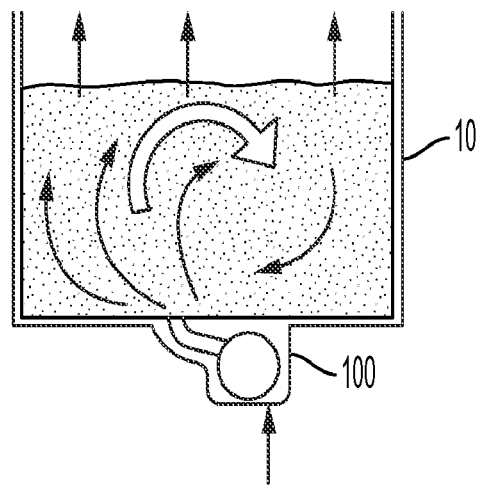
FIG. 4 is a conceptual illustration of an example implementation of the example injector of FIGS. 2 and 3 where the injector is used to flood and/or stir a stationary or moving bed of solid material.
Figure 5:
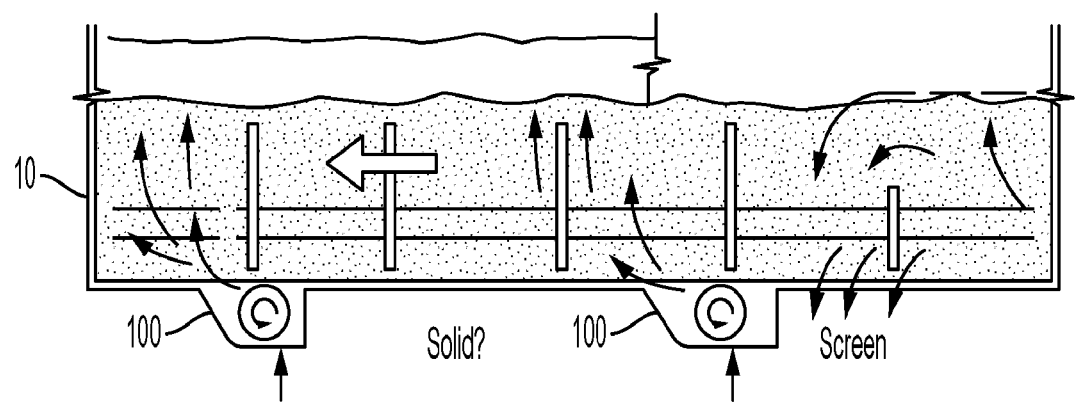
FIG. 5 is another conceptual illustration of the example injector of FIGS. 2 and 3 where the injector is used to flood and provide countercurrent stages of miscella in an extraction process.

Inlet 102 of injector 100 can receive a variety of different liquids from a variety of different sources. In some examples, inlet 102 is in fluid communication with a source of solvent for extractor 10, which may be fresh solvent or solvent that has been used in one or more stages of earlier extraction (e.g., partial miscella). For example, FIG. 4 is a conceptual illustration of an example implementation of injector 100 for extractor 10 where the injector is used to flood and/or stir a stationary or moving bed of solid material. In different implementations, the radial flow direction provided by the injector may be about an axis parallel to a direction of material travel or perpendicular to a direction of material travel. FIG. 5 is another conceptual illustration of injector 100 for extractor 10 where the injector is used to flood and provide countercurrent stages of miscella in an extraction process.

While the foregoing description as generally described injector 100 in the example implementation where the injector is used to introduce solvent flowing upwardly into a bed of material on a bed deck, it should be appreciated that injector according to the disclosure is not limited to such an example application. Injector 100 can be used in a variety of other applications associated with extractor 10.

Figure 6:
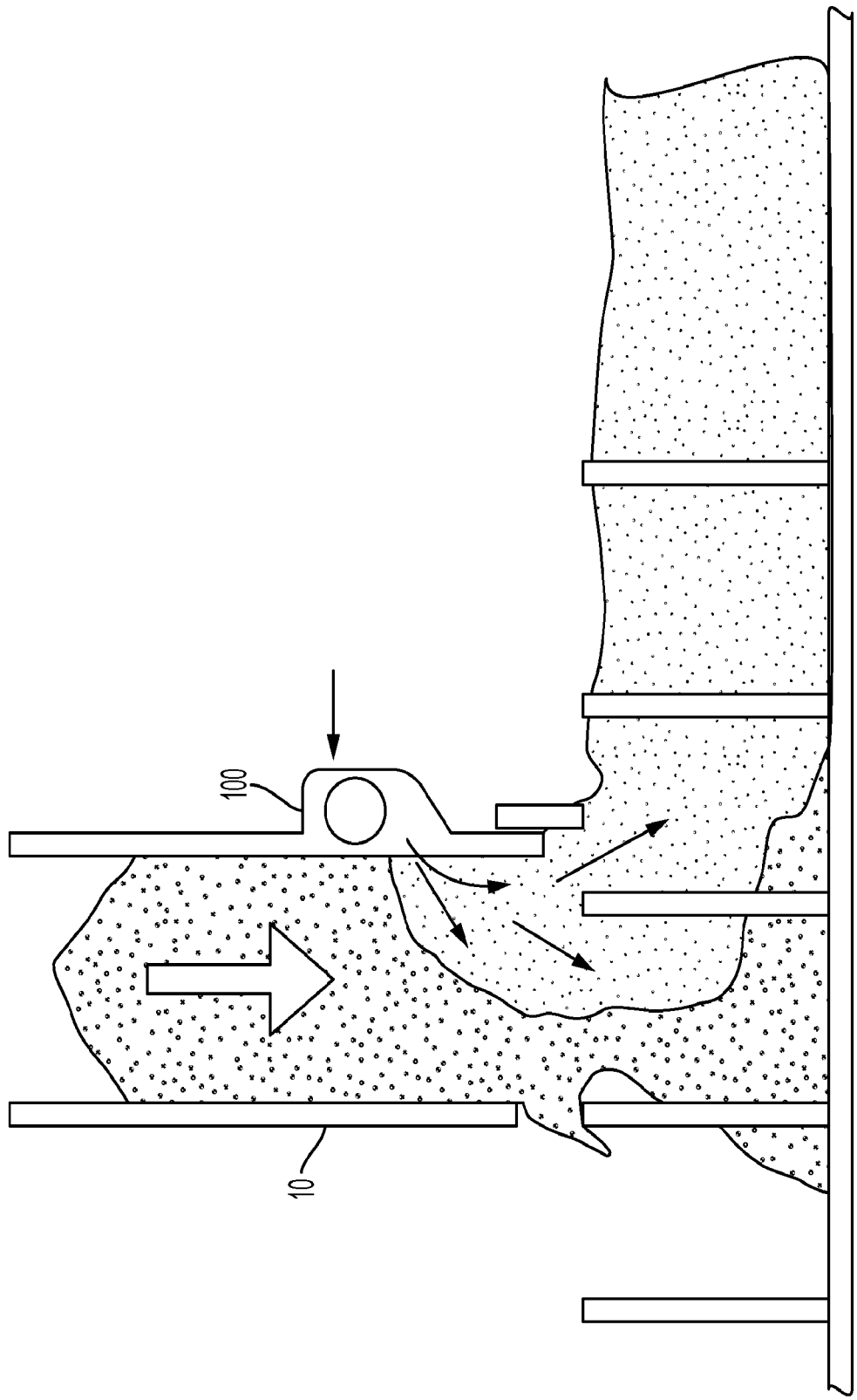
FIG. 6 illustrates an example application where the example injector of FIGS. 2 and 3 is located on or adjacent a wall of a chute or hopper of an extractor.

For example, FIG. 6 illustrates an example application where injector 100 is located on or adjacent a wall of a chute or hopper (e.g., inlet 14) of extractor 10. When so configured, injector 100 may introduce liquid into a falling column of solid material so as to initiate an extraction process and/or help the solid material transition from flowing downwardly in a vertical direction to moving horizontally within extractor 10.

Figure 7:
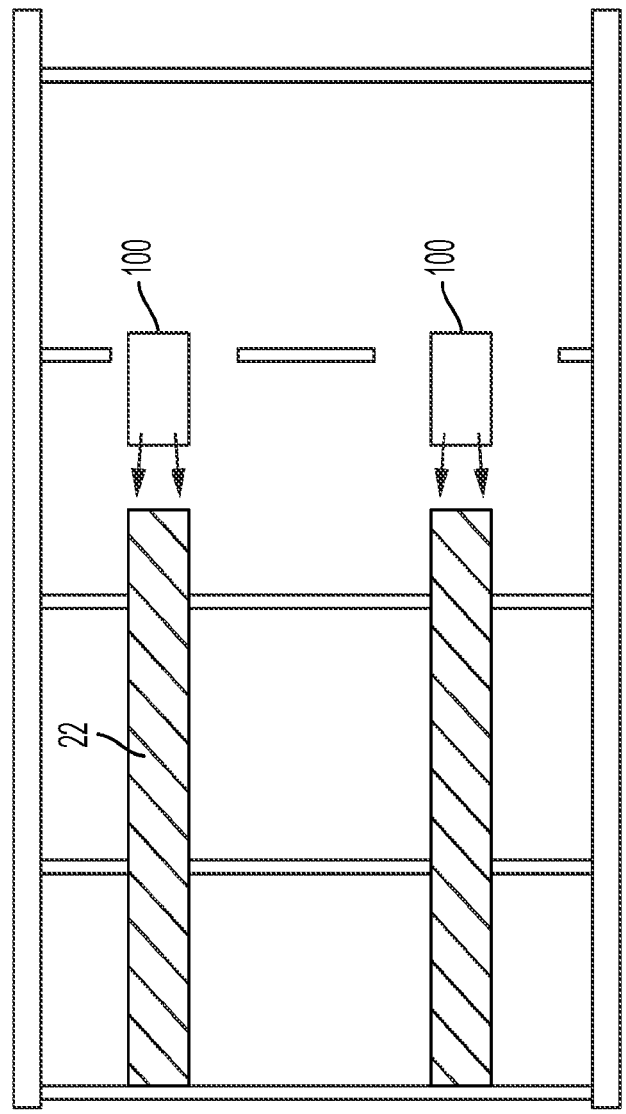
FIG. 7 illustrates another example where one or more injectors are used to provide liquid to a conveyance system, e.g., for lubrication.

FIG. 7 illustrates another example where one or more injectors 100 are used to provide liquid to a conveyance system 22. For example, injector 100 may be arranged relative to an endless drive line, such as one or more chains, of conveyor system 22 to provide lubricating fluid to the conveyor system. The lubricating fluid may be solvent, miscella, and/or oil extracted and separated from solvent via extractor 10.

Various examples have been described. These and other examples are within the scope of the following claims.

The invention claimed is:

1. A liquid injection system comprising:
a deck surface configured to support a solid material being processed;
at least one liquid injection orifice extending through the deck surface for supplying liquid to the solid material on the deck surface; and
at least one injector positioned below the deck surface and configured to receive a liquid from a source and cause the liquid to rotate within the injector before discharging the liquid through an outlet in fluid communication with the at least one liquid injection orifice,
wherein the injector comprises a body defining a chamber having a generally circular cross-sectional shape, an inlet tangent to and in fluid communication with the chamber, and the outlet is tangent to and in fluid communication with the chamber, and
wherein the injector is configured to cause the liquid to rotate within the injector by redirecting liquid flow from the inlet to the outlet in a circular flow direction.

2. The system of claim 1, wherein:
the inlet extends from the chamber at an angle greater than 90 degrees relative to an axis orthogonal to the deck surface, and
the outlet extends from the chamber at an angle ranging from −75 to −120 degrees relative to the axis orthogonal to the deck surface.

3. The system of claim 1, wherein the injector is coupled, directly or indirectly, to the deck surface.

4. The system of claim 1, wherein the outlet includes a first portion extending generally parallel to the deck surface and a second portion angled upwardly to the liquid injection orifice relative to the first portion.

5. The system of claim 4, wherein the first portion extends within a range from plus 15 degrees to minus 15 degrees relative to a plane parallel to a top surface of the deck surface.

6. The system of claim 1, wherein the at least one liquid injection orifice extends across at least half of a width of the deck surface.

7. The system of claim 1, further comprising a conveyance system configured to convey the solid material across the deck surface as the injector injects the liquid into the solid material.

8. The system of claim 1, wherein the solid material comprises a granular material, and at least a portion of the granular material has a size less than a size of the liquid injection orifice.

9. The system of claim 1, wherein the liquid injection orifice has a width ranging from 5 mm to 50 mm.

10. The system of claim 1, further comprising an extraction chamber and a conveyance system, wherein:

the deck surface is a bed deck configured to support the solid material as the solid material is conveyed through the extraction chamber;

the conveyance system is configured to convey the solid material along the bed deck in a direction of material travel;

the at least one liquid injection orifice extends through the bed deck for supplying solvent to the solid material on the bed deck; and at least one injector is configured to receive a solvent from the source and cause the solvent to rotate within the solvent injector before discharging the solvent through the outlet in fluid communication with the at least one liquid injection orifice.

11. The system of claim 10, wherein the bed deck comprises a screen and the at least one solvent injection orifice comprises a slit formed between adjacent portions of the screen.

12. The system of claim 10, wherein the at least one injector is positioned below the bed deck and the solid material positioned thereon and is configured to supply the solvent vertically upwardly, and further comprising a fluid removal system disposed above the bed deck and configured for removing the solvent after it has passed through the solid material.

13. A method comprising:
conveying a solid material in a conveyance direction along a deck surface in an extraction chamber; and
injecting a solvent upwardly into the solid material on the deck surface through at least one liquid injection orifice extending through the deck surface with at least one injector, the at least one injector receiving the solvent from a source and causing the solvent to rotate within the solvent injector before discharging the solvent through an outlet in fluid communication with the at least one liquid injection orifice, wherein the injector comprises a body defining a generally circular chamber, an inlet tangent to and in fluid communication with the chamber, and the outlet is tangent to and in fluid communication with the chamber, and causing the solvent to rotate within the solvent injector comprises rotating the solvent within the injector by redirecting liquid flow from the inlet to the outlet in a circular flow direction.

14. The method of claim 13, wherein:
the inlet extends from the chamber at an angle greater than 90 degrees relative to an axis orthogonal to the deck surface, and
the outlet extends from the chamber at an angle ranging from −75 to −120 degrees relative to the axis orthogonal to the deck surface.

15. The method of claim 13, wherein the solid material comprises a granular material, and at least a portion of the granular material has a size less than a size of the liquid injection orifice.

16. The method of claim 13, wherein the liquid injection orifice has a width ranging from 10 mm to 25 mm.

* * * * *